United States Patent [19]

Ash et al.

[11] Patent Number: 4,781,783

[45] Date of Patent: Nov. 1, 1988

[54] VACUUM RING FOR PRODUCING LAMINATED GLASS

[75] Inventors: Charles E. Ash, Perrysburg; Scott W. Chambers, Millbury, both of Ohio

[73] Assignee: Libbey-Owens-Ford Co., Toledo, Ohio

[21] Appl. No.: 112,414

[22] Filed: Oct. 26, 1987

[51] Int. Cl.⁴ .................................... B32B 31/24
[52] U.S. Cl. ................................. 156/382; 156/87; 156/104; 156/285; 156/286
[58] Field of Search .................. 156/87, 99, 104, 285, 156/286, 382

[56] References Cited

U.S. PATENT DOCUMENTS

| | | | |
|---|---|---|---|
| 1,870,284 | 8/1932 | Drake | 156/104 |
| 2,948,645 | 8/1960 | Keim | 156/104 |
| 2,992,953 | 7/1961 | Talburtt | 156/382 X |
| 3,074,466 | 1/1963 | Little | 156/104 X |
| 3,074,838 | 1/1963 | Little | 156/104 X |
| 3,281,296 | 10/1966 | Jameson | 156/104 |
| 3,808,077 | 4/1974 | Rieser et al. | 156/104 X |
| 3,933,552 | 1/1976 | Shumaker | 156/104 |
| 4,242,403 | 12/1980 | Mattimoe et al. | 428/213 |
| 4,624,731 | 11/1986 | Ash et al. | 156/382 |
| 4,647,327 | 3/1987 | Rase | 156/87 |

Primary Examiner—Robert A. Dawson
Attorney, Agent, or Firm—Marshall & Melhorn

[57] ABSTRACT

A vacuum ring is coupled to a vacuum source and utilized to de-air a laminated glass assembly while it is positioned within a pressurized and heated autoclave unit. The vacuum ring has a channel for receiving the edge of the glass assembly and is fabricated to minimize the extrusion of the laminating material during the autoclave operation. The walls of the channel each have a single longitudinally extending groove approximately centered between the edges of the wall, and the floor of the channel includes a single longitudinally extending groove positioned to be adjacent the edge of a laceration shield layer of the glass assembly. All three grooves interconnect with the vacuum source. The channel generally conforms to the outer edge of the glass assembly with or without applied vacuum or pressure, and the provision of grooved walls greatly enhances the sealing of the ring to the glass.

6 Claims, 1 Drawing Sheet

VACUUM RING FOR PRODUCING LAMINATED GLASS

BACKGROUND OF THE INVENTION

The present invention relates generally to a vacuum system for evacuating the space between at least two laminae of a laminated assembly and in particular to a vacuum ring construction which is utilized for de-airing a laminated glass assembly such as an automobile windshield, for example, which is an improvement over the ring construction disclosed in U.S. application Ser. No. 710,287 filed Mar. 11, 1985, entitled VACUUM RING FOR PRODUCING LAMINATED GLASS, now U.S. Pat. No. 4,624,731, dated Nov. 25, 1986.

In the early stages of the automobile industry, single sheets of ordinary glass were employed as windshields. As it became evident that this type of windshield presented a considerable safety hazard, the single sheets of ordinary glass were replaced with single sheets of heat treated or tempered glass. Thereafter, laminated safety glass was developed to further reduce the severity of lacerative injuries. The use of laminated glass assemblies greatly increased, until today, when almost all automotive windshields are constructed of some type of laminated glass.

Typically, a laminated glass assembly of the type utilized in vehicle windshields consists of two sheets of glass bonded together with a thin plastic interlayer, such as a sheet of polyvinyl butyral, or the like. In the event of an impact on the laminated glass sufficient to break it, the plastic interlayers function to bind the glass fragments together, thus reducing the risk of injury to a driver or passenger as a result of flying glass or contact with the windshield.

Recently, it has been found that the addition of a second plastic layer to the inner surface of the windshield further reduces the risk of injury. This second plastic layer has been called an anti-laceration shield. Also, it has been found that a single sheet of glass having an anti-lacerative plastic layer applied to its inner surface can serve as a safety windshield or other type of safety window.

A detailed discussion of laminated windshield assemblies and their production methods can be found in U.S. Pat. Nos. 3,808,077 and 4,242,403, both of which are hereby incorporated by reference.

One of the problems of manufacturing laminated glass assemblies of this type is related to the assembling and bonding techniques used to produce a windshield having high optical qualities, characterized by the lack of defects sometimes called "blow-ins." Once the individual laminae of the laminated assembly have been assembled in a stacked arrangement, the individual laminae are pressed toward one another while the entire assembly is heated to a predetermined temperature to cause the layers of plastic material to soften and bond to the adjacent glass sheets. This is typically done in an autoclave. The autoclave chamber is sealed, heated and pressurized, which causes the desired bonding to occur.

Prior to placing the stacked arrangement of individual laminae in an autoclave, it has been found desirable to "de-air" the assembly by evacuating air spaces which may be present between the individual laminae. One method is to place the assembly in a plastic bag and evacuate the bag. A more current method is to use a vacuum ring of the type disclosed in U.S. Pat. Nos. 2,948,645 and 3,074,466. These patents disclose a flexible vacuum ring which is provided with a channel for receiving the entire peripheral edge of the assembly. The channel of the vacuum ring includes a recessed portion which is maintained in a spaced-apart relationship with the entire peripheral edge of the glass assembly, to define a vacuum passage.

In some instances, it is desirable to maintain the vacuum ring in place when the assembly is within the autoclave, and to apply a vacuum to the ring during at least part of the time the assembly is heated and pressurized. However, one of the problems with that approach is that the softened plastic layers are drawn outwardly, past the marginal edges of the glass sheets and into the recessed portion of the vacuum ring. This tends to reduce the thickness of the plastic layers around the marginal edges of the glass, and produce undesirable optical distortion in those areas.

SUMMARY OF THE INVENTION

The present invention relates to a unique vacuum ring construction which substantially eliminates the distortion which can occur about the peripheral edges of the laminated assembly during the heating and pressurizing operation in the autoclave.

The vacuum ring of the present invention is adapted to be coupled to a vacuum source and to be mounted about the peripheral edge of the laminated assembly. The ring is constructed of a flexible material, such as by an extrusion or molding of a rubber material, with a vacuum tee molded to and bridging its free ends. The ring is provided with a channel formed therein for receiving the peripheral edge of the laminated assembly.

In accordance with the present invention, the channel defines an inner surface having a cross-sectional configuration defined by the shape of the outer edge surface of the laminated assembly before the ring is mounted on the laminated assembly and coupled to the vacuum source. This inner surface is defined by first and second facing wall sections, and an interconnecting floor portion. Each facing wall portion includes a longitudinally extending continuous single groove formed therein; the grooves being distal to both the outer edge of the wall and to the floor portion, and being formed in facing intermediate portions of the first and second walls. The grooves are provided in order to maintain the requisite level of vacuum to the marginal edges of the laminated assembly. In the event that the plastic layers flow outward of the marginal edges and restrict the vacuum along the floor portion of the vacuum ring, these grooves will provide the required vacuum to laminate the assembly. Also, the floor portion includes a longitudinally extending continuous single groove having a width substantially coextensive with the thickness of an edge of an intermediate one of the laminae. The floor portion groove is disposed adjacent this edge when the ring is mounted on the laminated assembly to be bonded. The two grooves in the walls and the single groove in the floor portion are connected to the source of vacuum.

In the preferred embodiment of the invention, the single groove in the floor portion is aligned with the anti-laceration shield layer, and extends the length of the ring, about the entire periphery of the laminated assembly.

BRIEF DESCRIPTION OF THE DRAWINGS

The above, as well as other advantages of the present invention, will become readily apparent to one skilled in the art from reading the following detailed description of the invention in conjunction with the attached drawings in which.

DESCRIPTION OF THE PREFERRED EMBODIMENT

It should be noted at the outset of this description that, while the vacuum ring of the present invention is described for use in connection with producing a particular laminated glass assembly, it will be appreciated that the vacuum ring can be utilized in the manufacturing of other types of laminated assemblies, including single sheets of glass with an anti-laceration layer, and multiple layers of non-glass materials.

Figure 1:
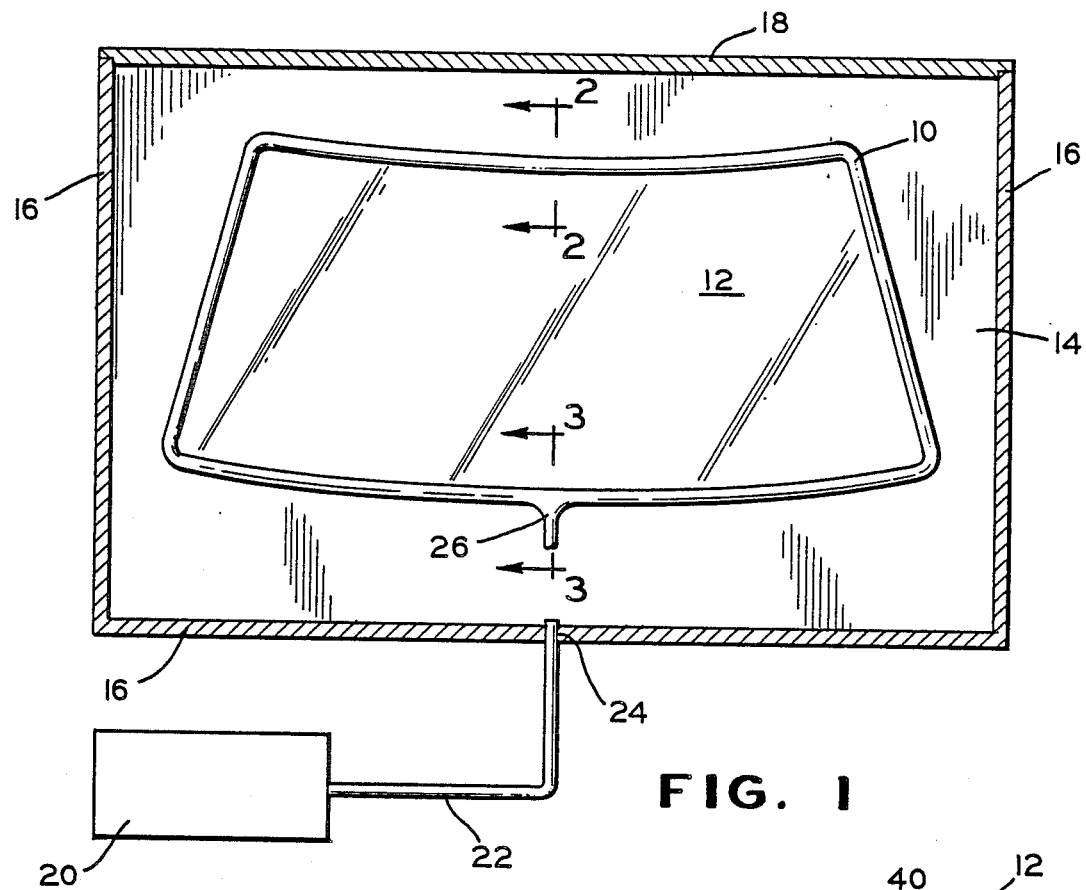
FIG. 1 is a schematic view of a laminated glass assembly having a vacuum ring of the present invention mounted about the peripheral edge of the glass assembly, with the assembly located in an autoclave chamber, and connected to a vacuum source.

Turning first to FIG. 1, there is shown a schematic view of a vacuum ring 10 positioned around the peripheral edge of a laminated glass assembly 12. The individual laminae of the laminated assembly 12 of FIG. 1 are shown in more detail in the cross-sectional views of FIGS. 2 and 3. The laminated glass assembly 12 and the vacuum ring 10 are shown placed in an autoclave chamber 14, bounded by an autoclave wall 16 and a removable top panel 18.

The vacuum ring 10 is shown connected to a vacuum source 20, through a line 22 which enters the chamber 14 through an appropriate sealed aperture 24, and is connected to the ring 10 at a vacuum tee portion 26.

It will be apparent that, in practice, the chamber 14 is large enough to accommodate a large number of the laminated glass assemblies 12 and the vacuum rings 10, and includes appropriate support means, not shown, for them, and an appropriate vacuum distribution network, not shown. Also, the autoclave is preferably a steam autoclave, and is operated to produce a pressure of sixteen to seventeen atmospheres, while the pressure within the vacuum ring 10 is near zero atmospheres, for a pressure differential of seventeen to eighteen atmospheres. This may make apparent the derivation of the term "blow-ins" for visual defects caused by poor sealing of a vacuum ring.

Figure 2:
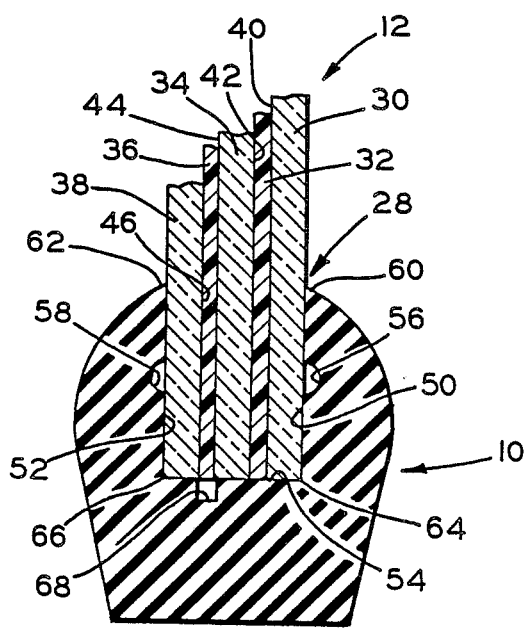
FIG. 2 is an enlarged fragmentary sectional view as if taken along line 2—2 of FIG. 1, showing the vacuum ring of the invention and an assembly of a laminated shield layer and a removable cover glass sheet.

In FIG. 2, there is shown the cross sections of the ring 10 and the laminated glass assembly 12. It will be apparent that a modification could be made in the spacing between the side walls to form the ring 10 to accommodate a number of layers to make a single pane with an anti-laceration shield, a conventional four layer laminated windshield, or to accommodate a larger number of non-glass laminae. It will also be apparent that the ring 10 is of generally the configuration illustrated in its rest state, although the channel 28 it defines has walls which converge somewhat in their rest state, and is not forced into this shape from another by the pressure differential produced by the autoclave chamber 14 and the vacuum source 20.

As illustrated in FIG. 2, the laminated glass assembly 12 includes an outer glass sheet 30, a laminating plastic sheet 32, an inner glass sheet 34, an anti-laceration shield layer 36, and a cover glass sheet 38.

The laminating plastic sheet 32 bonds an inner side 40 of the outer glass sheet 30 to an outer side 42 of the inner glass sheet 34, while the anti-laceration shield layer 36 is bonded to an inner side 44 of the inner glass sheet 34. The shield layer 36 is not bonded to the cover glass sheet 38, since it has a surface 46 which is typically coated with a mold release compound of a waxy nature to prevent bonding.

The channel 28 is formed of a first wall portion 50, a second wall portion 52, and an interconnecting floor portion 54. The wall portions 50 and 52 both include a longitudinally extending continuous single grooves 56 and 58 respectively, each of which is approximately centered on the wall portions 50 and 52, and are thus distal from both the respective outer edges 60 and 62 of the wall portions 50 and 52, and from the respective intersections 64 and 66 of the wall portions 50 and 52 and the floor portion 54. These grooves maintain the requisite level of vacuum to the laminated assembly in the event the floor portion of the vacuum ring becomes restricted by the plastic layers flowing out of the marginal edges.

The floor portion 54 includes a longitudinally extending continuous single groove 68, which is illustrated as being substantially coextensive in width with the thickness of the anti-laceration shield layer 36. It should be noted that except for the grooves 56, 58, and 68, the channel 28 tightly conforms to the peripheral edge of the laminated glass assembly 12.

In the preferred embodiment of the invention, the groove 68 extends around the entire periphery of the laminated glass assembly 12, although the ring 10 may be modified to omit the groove 68 over all or a part of its length, if desired.

Figure 3:
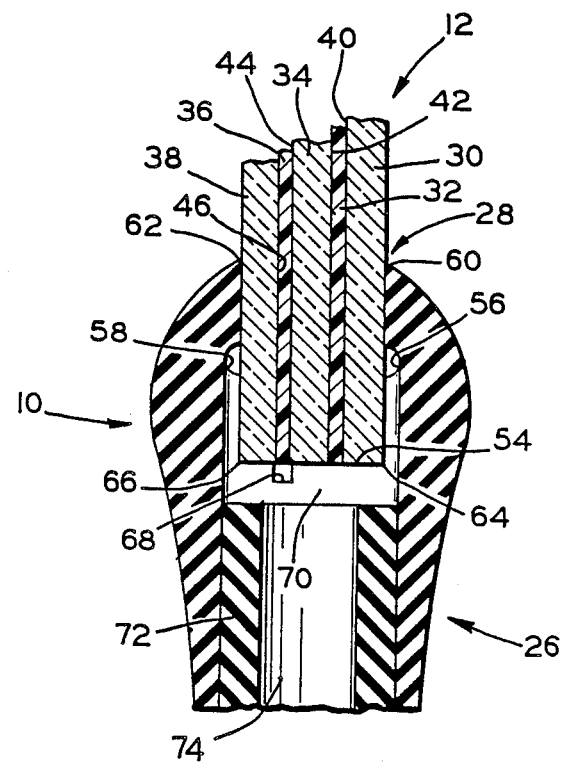
FIG. 3 is an enlarged fragmentary sectional view taken along line 3—3 of FIG. 1, showing the assembly of FIG. 2 as it appears at the vacuum tee portion.

FIG. 3 is a section through the vacuum tee portion 26 illustrating that the grooves 56, 58, and 68 are connected to a source of vacuum such as the source 20. It may be noted that an interconnecting chamber 70 is of a shape formed by the intersection of a cylindrical passage with the rectangular channel 28, and that a reinforcing and interconnecting tube 72 is disposed in a cylindrical passage 74, and can be formed in place using conventional "double-shot" molding techniques, or formed separately and attached in any convenient fashion.

In a preferred embodiment of the invention, the groove 68 has a depth substantially equal to its width. This construction of the floor portion 54 minimizes the amount of softened plastic that can escape past the marginal edges of the glass sheets, while allowing a controlled amount of extrusion of the anti-laceration shield layer 36, which is desirable since there may be a geeater shape discrepancy between the cover glass sheet 38 and the inner glass sheet 34 than between inner and outer glass sheets 34 and 30, which are either sequentially produced or mixed production selected for matching curvatures. The controlled extrusion allowed by the groove 68 compensates for this potential discrepancy without allowing the formation of significant visual defects. However, since defects in a windshield are least noticeable at the bottom, and any dimunation in thickness in the layer 36 is at least an instrumentally-detectable defect, the groove 68 can be provided only adjacent the bottom of the laminated glass assembly 12.

Thus, the invention provides a vacuum ring for evacuating the air spaces between laminae of a laminated assembly, which improves sealing to the laminae, whether of glass or other materials, and varying thicknesses and number of layers.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A vacuum ring for use in removing air spaces between the facing surfaces of at least two laminae of a laminated assembly, said ring being adapted to be coupled to a vacuum source and to be mounted about the entire peripheral edge of the laminated assembly, said ring being formed of a flexible material and having a channel formed therein for receiving the peripheral edge of the laminated assembly, said channel defining an inner surface having a cross-sectional configuration which generally conforms to the cross-sectional configuration defined by the outer edge surface of the laminated assembly, said inner surface defining first and second facing wall portions and an interconnecting floor portion, each said facing wall portion having a longitudinally extending continuous groove formed therein, each said groove being spaced between an outer edge and an intersection of said wall portion and said floor portion, and said grooves in said first and second wall portions being coupled to a source of vacuum when the ring is mounted on a laminated assembly and coupled to a vacuum source.

2. A vacuum ring according to claim 1 wherein another longitudinally extending continuous groove is formed in said floor portion having a width substantially coextensive with the thickness of an edge of an intermediate one of the laminae in a laminated structure and being disposed about an edge of an intermediate laminae when the ring is mounted on a laminated assembly, said another groove in said floor portion being coupled to a source of vacuum when the ring is mounted on a laminated assembly and coupled to the vacuum source.

3. A vacuum ring according to claim 2 wherein a laminated assembly is an anti-laceration windshield assembly having a first glass layer, a second glass layer, a first plastic layer between said first and second glass layers, and a second plastic layer adjacent said second glass layer and distal to the first plastic layer, together with a removable cover glass layer covering said second plastic layer, and wherein said single groove in said floor portion is substantially coextensive in width with the peripheral edge of said second plastic layer.

4. A vacuum ring according to claim 2 wherein said another groove is a bottom groove, disposed adjacent a lower edge portion of a laminated glass windshield assembly when said ring is mounted on such a laminated assembly.

5. A vacuum ring according to claim 2 wherein said another groove is disposed about the entire peripheral edge of a laminated assembly when said ring is mounted on such a laminated assembly.

6. A vacuum ring according to claim 2 wherein a laminated assembly includes a first glass layer, an anti-laceration plastic layer, and a removable cover glass covering said plastic layer, said anti-laceration plastic layer being said intermediate one of the laminae, said another groove in said floor portion being substantially coextensive in width with the peripheral edge of said anti-lacerative plastic layer.

* * * * *